Figure 1:
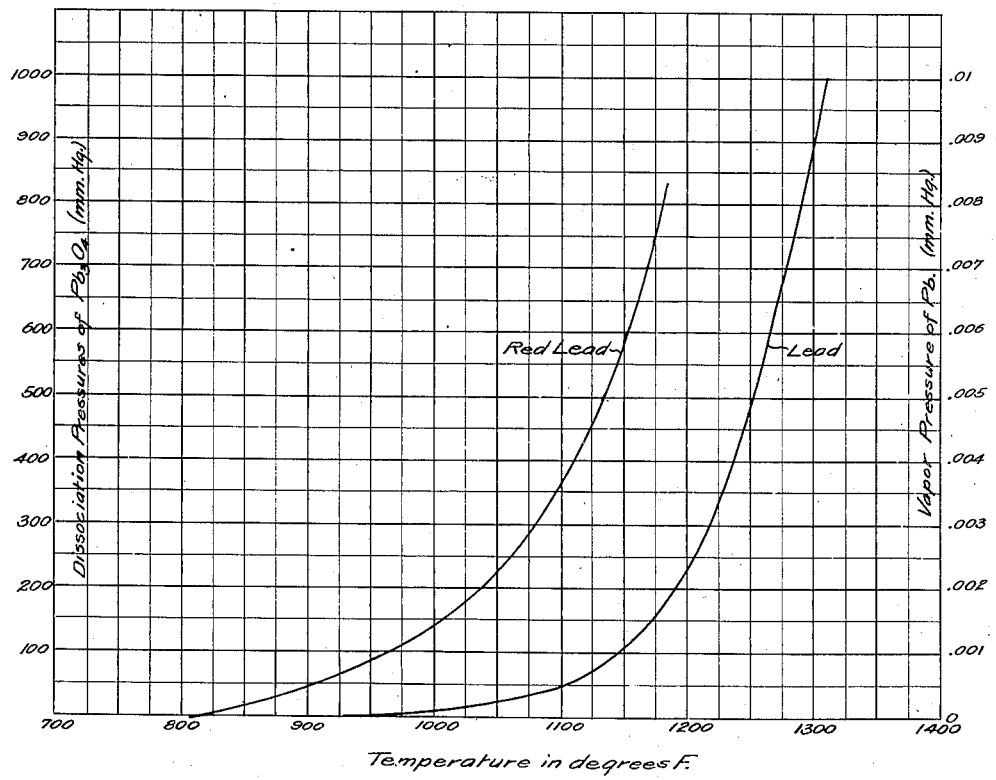

July 15, 1930.  P. E. HAYNES  1,770,777
PROCESS AND APPARATUS FOR PREPARING LEAD OXIDES
Filed Dec. 23, 1925   2 Sheets-Sheet 2
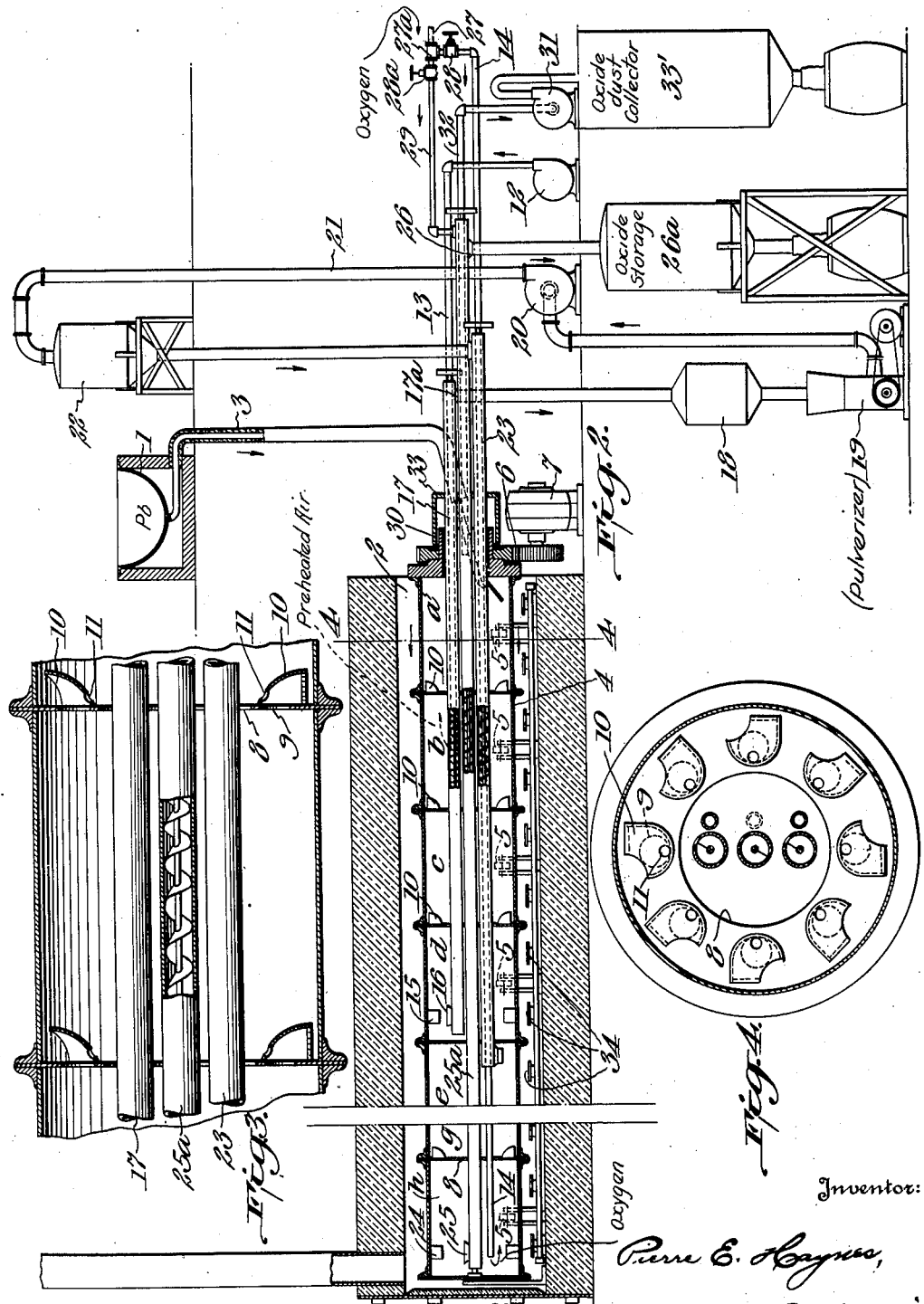
Inventor:
Pierre E. Haynes,
By Byrnes, Townsend & Brickenstein,
Attorneys.

Patented July 15, 1930

1,770,777

UNITED STATES PATENT OFFICE

PIERRE E. HAYNES, OF EAST AURORA, NEW YORK, ASSIGNOR TO THE LINDE AIR PRODUCTS COMPANY, A CORPORATION OF OHIO

PROCESS AND APPARATUS FOR PREPARING LEAD OXIDES

Application filed December 23, 1925. Serial No. 77,334.

This invention relates to a process and apparatus for the production of oxides of lead, and it comprises a process wherein lead is converted into oxides by initially treating molten lead in an oxidizing atmosphere containing oxygen in substantially atmospheric proportion and, as the oxidation proceeds, bringing the partially oxidized mixture into contact with a gas substantially richer in oxygen. More particularly, the invention in its preferred form comprises a continuous process for the manufacture of red lead in which the molten lead is passed through an oxidizing zone in countercurrent relation to a stream of an oxidizing gas, the oxygen content of which varies progressively from that of air at the point where oxidation is commenced to that of commercial oxygen at the exit from said zone. The partially oxidized product may be withdrawn at any convenient intermediate stage in the process for the purpose of grinding it to expose fresh surfaces of the unoxidized lead and thus speed up the oxidation when the product is re-introduced into the oxidizing atmosphere. An externally heated rotary kiln provided with means for advancing the oxidized product and retarding the forward movement of molten lead is used in carrying out the process.

The use of oxygen in the manufacture of lead oxides is disclosed in U. S. patent to Huffard and Haynes, 1,491,237, April 22, 1924. In the process there disclosed the speed of the lead-oxygen reaction is greatly increased by the use of oxygen instead of air and by raising the reaction temperature by external heating means.

In order to show the technical advantage of the use of oxygen, Fig. 1, containing curves of vapor tensions of lead and the dissociation pressures of red lead, has been included. It is obvious from these curves that lead will become more active in the presence of oxygen as the temperature is increased because of the rapid increase of vapor tension. It is equally obvious that the increase in temperature increases the tendency of red lead to decompose into monoxide and oxygen.

Using air as the oxidizing agent it becomes exceedingly difficult and finally impossible to oxidize lead to red lead with air as the temperature is progressively increased because a point is finally reached where oxygen is given up by dissociation as rapidly as it is absorbed. Thus, it is found that the dissociation pressure of red lead is 21% of one atmosphere at 1012° F. and this is, therefore, the highest temperature at which red lead will form using air as the oxidizing agent. As a matter of fact, the removal of oxygen from the air by the lead makes it necessary to use a lower temperature and hence the speed of the reaction is reduced.

On the other hand, when oxygen is used, its advantages are compounded by the fact that in addition to the normal increase in the rate of the reaction due to the increase in oxygen content of the oxidizing atmosphere, it is possible to employ higher temperatures where the speed of oxidation is greater. Higher temperatures also increase the vapor tension of lead and, therefore, its avidity for oxygen.

Therefore, it will be apparent that the need for higher oxygen content becomes greater as the red lead content is increased. Accordingly I have found that, when oxygen is used in countercurrent relation to lead monoxide and lead or a mixture of the tetroxide, monoxide and fused metallic lead, the speed of the reaction is much accelerated. Also it has been found possible to use air for the first and major portion of the reaction and then bring the product of this initial treatment into contact with a gas containing oxygen in proportion substantially greater than atmospheric. This gas is preferably commercial oxygen containing about 98% or more $O_2$, although most of the advantages of the invention may be secured by using an oxidizing gas containing a smaller proportion of oxygen, if materially in excess of that in air.

Since the dissociation and melting temperatures of the monoxide are relatively high it will be possible to operate the initial oxidation at a temperature above the remainder of the reaction and thus take advantage of the increased vapor tension of lead. As the reaction producing the monoxide progresses it will be possible to reduce the temperature and allow the "coloring" reaction, in which the monoxide is converted to tetroxide, to start. It is also within the scope of the invention, however, to conduct the oxidation of the monoxide to the tetroxide at temperatures similar to those used in the initial oxidation stage, since with the use of oxygen or an oxygen-enriched atmosphere the temperature at which dissociation of the tetroxide takes place in raised. The range of 930° to 1200° F. is preferred for carrying out the initial oxidation although higher or lower temperatures may be used with good results. The "coloring" reaction may be carried out at a temperature within the range above-mentioned or at a lower temperature as desired.

Another marked advantage of the continuous process which I have devised lies in the conservation of the heat liberated in the exothermic reaction between the lead and oxygen. Thus the heat from the most energetic phase of the reaction is available for the maintenance of the necessary temperature for the slower phase, and therefore it will be practicable to operate the continuous process with just enough fuel to make up the actual heat requirements including thermal losses.

It has also been found advantageous to withdraw the oxide at some intermediate point and grind it to the fineness ultimately desired. While the point chosen for grinding is purely arbitrary, it is preferred to select the point at which the reaction is slowing up because unoxidized material is rapidly becoming coated with oxide. Grinding at this point very materially speeds up the oxidation. The heat content of the oxide withdrawn may also be utilized for pre-heating the air used for oxidation.

For a detailed description of the process and apparatus used in carrying out my invention attention is directed to the accompanying drawing in which Fig. 1 illustrates the curves of vapor tensions and dissociation pressures of lead and red lead, respectively. Fig. 2 is a longitudinal view of the preferred apparatus partly in vertical section and partly in elevation, Fig. 3 is a longitudinal vertical section through a portion of the oxidizing kiln, while Fig. 4 represents a section of the oxidizing kiln taken on the line 4—4 of Fig. 2.

Molten lead is supplied from the lead melting pot 1, which is preferably heated by waste combustion gases led from the furnace chamber 2 by suitable connections not shown. The molten lead is conducted by an insulated pipe 3 to section $a$ of a rotating externally heated kiln 4. The rotating kiln 4 consists of any suitable number of cast iron flanged sections secured end to end in any suitable way and mounted on rollers 5. The kiln is rotated by means of gearing 6 and the motor 7. Any desired number of sections may be employed, but according to my preferred embodiment eight are used and are referred to hereafter as $a$, $b$, $c$, $d$, $e$, $f$, $g$ and $h$. Between each two sections is a cast iron plate or baffle with a large opening 8 at the center and, with the exception of the baffle between sections $d$ and $e$, a plurality of smaller openings 9 positioned equidistantly about the central opening. A bucket 10 is placed opposite each of the smaller openings. These buckets are adapted, as the kiln rotates, to pick up a mixture of oxides and possibly some molten lead. As the bucket rises the molten lead trickles to the bottom of the bucket where it is trapped and escapes through a small opening 11. The oxide partially or completely freed from metal passes by gravity to the next section.

Gaseous communication is maintained between the various sections by means of the central opening 8 in each of the baffle plates. Air, pre-heated by any suitable means not shown, is forced by the fan 12 through the pipe 13 and passes into the sections $a$, $b$ and $c$ of the kiln 4 where, coming into contact with the molten lead or with lead monoxide, oxidation takes place according to the reactions:

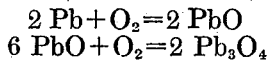

$$2\ Pb + O_2 = 2\ PbO$$
$$6\ PbO + O_2 = 2\ Pb_3O_4$$

Substantially pure oxygen is introduced into section $h$ by means of pipe 14 leading from any suitable source not shown. As previously described the oxidized portions of the lead are passed progressively through the sections $a$, $b$, $c$ and $d$, and finally come in contact with relatively pure oxygen issuing from the right end of section $e$. Further oxidation takes place with a partial coloring of the lead oxides and in section $d$ the mixture of oxides is picked up by buckets 15 attached to the walls of the kiln and dropped into the hopper 16 of the conveyor 17 which transports it to a point 17ª and drops it into a hopper 18 feeding the pulverizer or mill 19. The ground material from the pulverizer or mill 19 is lifted by means of a suitable fan 20 positioned in the conduit 21 to a bag (not shown) and hopper 22, from which it is fed to conveyor 23 which transports it to section $e$ of the kiln 4. By the method above described the oxidation is continued and the mixture of oxides is passed progressively through sections $e$, $f$, $g$ and $h$ in contact with progressively richer oxygen. In section $h$ the product, which has been substantially all converted to red lead, is picked up by buckets 24 and dropped into hopper 25 of the conveyor 25ª and is transported to 26 where it is discharged into the storage bin 26ª.

The oxygen for the process is led from any suitable source by pipe 27 to the point 27ª. Valves 28 and 28ª provide for a division of the gas flow, the major portion passing through valve 28 and pipe 14 to section $h$ of the drum, while a smaller portion of the oxygen passes through valve 28ᵃ and pipe 29 to conveyor 25ᵃ where it passes in countercurrent relation to red lead and serves to complete the oxidation under optimum conditions of mixing and stirring produced by the conveyor. This last step is decidedly advantageous since relatively small quantities of oxide are in intimate contact with large quantities of the purest oxygen throughout the complete travel from section $h$ to point 26.

The whole kiln is maintained at atmospheric pressure by an annular opening 30 which communicates with the air. To prevent the blowing of oxide dust into the open air a suction fan 31 is used to maintain a slight minus pressure in the pipe 32 which extends through the vent cap 33 to a point adjacent the entrance to section $a$. Thus the quantity of gas withdrawn through the pipe 32 substantially equals that of the air introduced by the fan 12. The withdrawn gas, together with any oxide particles carried along therewith, is led to a bag 33' where the oxide is collected. This oxide may be returned to the furnace for further treatment.

As will be seen the process is entirely automatic and continuous, the elements of control being the quantities of molten lead and oxygen. As the system is maintained at atmospheric pressure no leakage of oxygen will take place.

The kiln is heated by means of burners 34 which are individually regulable to permit of the maintenance of any desired temperature in the different sections of the kiln.

It is to be understood that the rotation of the kiln will bring about considerable agitation of the lead and oxides and thus facilitate oxidation. However, agitation of the material may be increased by providing agitating plates on the walls of the kiln as is well understood in the art.

Various modifications of the means and procedure by which the advantageous effects of the invention are obtained, fall within the scope of the appended claims.

I claim:

1. Process of oxidizing lead, comprising passing molten lead through an oxidizing zone and passing in countercurrent relation thereto a stream of gas containing oxygen substantially in atmospheric proportion and, as the oxidation proceeds, leading the mixture of oxides formed into contact with a gas containing oxygen materially in excess of atmospheric proportion.

2. A continuous process of oxidizing lead, comprising passing into contact with molten lead a gas containing oxygen in substantially atmospheric proportion to at least partially oxidize the lead to lead monoxide, and then passing into contact therewith a gas containing oxygen materially in excess of atmospheric proportion until the desired oxidation is effected.

3. A continuous process of producing red lead, comprising partially oxidizing molten lead by passing pre-heated air into contact therewith, comminuting the resulting product, and then passing commercial oxygen into contact therewith to complete the oxidation.

4. A continuous process of oxidizing lead comprising passing molten lead through an oxidizing zone in countercurrent relation to a stream of gas which at the lead entrance to the oxidizing zone contains oxygen in substantially atmospheric proportion but is progressively richer in oxygen towards the exit from said zone; removing the product and grinding it; introducing the product into a second oxidizing zone and subjecting it to a gas containing oxygen materially in excess of atmospheric proportion; and finally intimately mixing and stirring the resulting oxide with relatively large quantities of substantially pure oxygen.

5. Process of oxidizing lead, comprising initially treating molten lead with air to at least partially oxidize it to monoxide, and then treating the product of the initial treatment with a gas containing oxygen materially in excess of atmospheric proportion until the major portion is converted into red lead.

6. Process of producing red lead, comprising treating molten lead with air at a relatively high temperature to at least partially oxidize it to lead monoxide, and then subjecting the partially oxidized product to further oxidation by passing into contact therewith a gas containing oxygen materially in excess of atmospheric proportion, the further oxidation being carried on at graduated lower temperatures.

7. Process of producing red lead, comprising initially oxidizing the lead at a relatively high temperature, reducing the temperature as the oxidation progresses, and carrying on the further oxidation at graduated lower temperatures.

8. Process of preparing lead oxides, comprising treating molten lead in an oxidizing zone to partially oxidize the same, separating the oxides from the residual metallic lead, and subjecting the oxides to further oxidation.

9. Process of preparing lead oxides, comprising introducing molten lead into an oxidizing zone, passing an oxidizing gas into contact therewith, and, as the oxidation proceeds, advancing the oxides through the oxidizing zone while preventing the forward movement of metallic lead.

10. Process of preparing lead oxides, comprising charging molten lead into a rotary kiln containing a plurality of communicating chambers, leading an oxidizing gas through the furnace in a direction opposite to that of the movement of the lead, and rotating the furnace to agitate the lead and to advance the oxides progressively through the respective chambers while retaining any residual lead in the initial oxidizing zone.

11. Apparatus for oxidizing lead, comprising a rotary kiln divided into a plurality of treating chambers, means for introducing molten lead into the first chamber, means for introducing an oxidizing gas into the kiln in countercurrent relation to the movement of lead through the kiln, and means adapted as the kiln rotates to separate oxides from the molten lead and to advance them through successive chambers, while retaining the molten lead in the first chamber.

12. Apparatus for oxidizing lead, comprising a rotary kiln made up of a plurality of communicating sections, means adapted to introduce molten lead into the first section, means adapted to advance the oxides formed through successive sections while retaining the molten lead in the first section, and means adapted to convey material from an intermediate section to a point outside the kiln and to re-introduce it into a succeeding section.

In testimony whereof, I affix my signature.

PIERRE E. HAYNES.